(12) United States Patent
Noniashvili et al.

(10) Patent No.: US 11,325,775 B2
(45) Date of Patent: May 10, 2022

(54) SINGLE-USE MEANS FOR PREPARING A BEVERAGE

(71) Applicant: Aleksey Iljich Noniashvili, Electrogorsk (RU)

(72) Inventors: Aleksey Iljich Noniashvili, Electrogorsk (RU); Andrey Rudolfovich Goldberg, Dolgoprudnyy (RU)

(73) Assignee: Aleksey Iljich Noniashvili, Moscow (RU)

( * ) Notice: Subject to any disclaimer, the term of this patent is extended or adjusted under 35 U.S.C. 154(b) by 0 days.

(21) Appl. No.: 16/484,723

(22) PCT Filed: Feb. 6, 2018

(86) PCT No.: PCT/RU2018/000067
§ 371 (c)(1),
(2) Date: Aug. 8, 2019

(87) PCT Pub. No.: WO2018/151625
PCT Pub. Date: Aug. 23, 2018

(65) Prior Publication Data
US 2019/0367262 A1 Dec. 5, 2019

(30) Foreign Application Priority Data
Feb. 15, 2017 (RU) .................. 2017104889

(51) Int. Cl.
*B65D 85/00* (2006.01)
*B65D 85/812* (2006.01)
*A47G 19/16* (2006.01)

(52) U.S. Cl.
CPC ........... *B65D 85/812* (2013.01); *A47G 19/16* (2013.01)

(58) Field of Classification Search
CPC .... B65D 85/812; B65D 85/804; B65D 33/14; B65D 85/808; A47G 19/16; A47G 21/106;
(Continued)

(56) References Cited

U.S. PATENT DOCUMENTS 2,614,934 A   10/1952   Trotman
2,728,672 A   12/1955   Young
(Continued)

FOREIGN PATENT DOCUMENTS

DE   202010007854 U1   10/2011

*Primary Examiner* — Ericson M Lachica
(74) *Attorney, Agent, or Firm* — Volpe Koenig

(57) ABSTRACT

A single-use means for preparing a beverage from an infusible product, containing a bendable sheet-like base with a designated bend line, and a moisture-permeable bag for brewing a product, wherein the bag has an upper portion attached by one side to the sheet-like base, and an unattached lower portion, wherein the sheet-like base and the bag are designed and mutually arranged such that the sheet-like base can cover a vessel containing a liquid, in which the bag is immersed during the brewing of a product, and such that the product can be squeezed after brewing by bending the sheet-like base and pressing the bag from two opposing sides using the bent sheet-like base, wherein to allow more careful squeezing of an infusion from the product in the bag after brewing, the region in which the attached side of the upper portion of the bag is attached to the sheet-like base is situated along a line that intersects the bend line of the sheet-like base, wherein the line along which the attachment region of the bag is situated substantially coincides with the bend of the bag in its suspended state on the base during use.

11 Claims, 3 Drawing Sheets

(58) Field of Classification Search
CPC .... A47J 31/0636; A47J 31/0626; A47J 31/06; A47J 31/02; A47J 31/10; A47J 31/18
See application file for complete search history.

(56) References Cited

U.S. PATENT DOCUMENTS

| | | | |
|---|---|---|---|
| 4,584,101 A * | 4/1986 | Kataoka | B65D 85/8043 210/474 |
| 5,318,786 A * | 6/1994 | Clarkson | B65D 85/812 426/79 |
| 2003/0185942 A1 | 10/2003 | Bishop | |
| 2005/0224373 A1* | 10/2005 | Bailey | B65D 31/12 206/219 |
| 2015/0053099 A1 | 2/2015 | Bickel | |
| 2016/0015200 A1* | 1/2016 | Bickel | A47G 21/106 100/296 |

* cited by examiner

SINGLE-USE MEANS FOR PREPARING A BEVERAGE

CROSS REFERENCE TO RELATED APPLICATIONS

This application is a 35 U.S.C. § 371 national phase application of PCT/RU2018/000067, which was filed Feb. 6, 2018, and claims the benefit of Russian Application No. 2017104889, which was filed Feb. 15, 2017, both of which are incorporated herein by reference as if fully set forth.

FIELD OF INVENTION

This invention relates to single-use means for preparing a beverage from infusible products, for example, tea, coffee, herb, and other infusible products.

BACKGROUND OF THE INVENTION

There are various known single-use means for preparing a beverage, made of fluid-permeable material, e.g. industrially made sealed bags of different form, e.g. rectangular or pyramidical bags with an infusible product (DE 10002863 A1), or open bags of rectangular form (DE 19957403 A1) which are subject to filling with an infusible product that may be chosen by a user.

Each of the two mentioned types of single-use bags has its advantages. Though sealed bags do not require any additional actions for filling them with any product, however, they limit users' choice to only special kinds of products in fixed doses, which are offered by manufacturers of sealed bags, such that commercially available sealed bags with a product represent packages of infusible product, each for one dose of beverage, which are not subject to modification by a user. On the other hand, single-use means with open bags are a convenient alternative to non-disposable brewing means, such as a tea brewing spoon, a tea brewing sieve, etc., because after use they can be simply thrown away, by contrast with non-disposable means which require cleaning and washing after each use.

Each of the two mentioned types of single-use bags is usually used for brewing a product in a vessel, such as a cup or a glass, containing hot or very hot liquid (maybe substantially boiling-hot water), and after expiration of the brewing period a bag with infusible product is squeezed to allow the infusion to flow more quickly into the vessel with prepared beverage. Therefore to such means there are raised not only easy-to-use and hygiene requirements in the process of preparing a beverage, but also safety requirements. For safe use of a single-use bag with infusible product it is necessary to protect user's fingers against hot liquid in which the beverage is prepared and to prevent contact between human hand fingers and the bag during squeezing of a hot infusible product.

To meet such requirements, earlier there was proposed a bag suspended on a bendable sheet-like base, as disclosed in U.S. Pat. No. 2,728,672 (published on 27 Dec. 1955) which is the closest analog of this invention. Due to the bendable sheet-like base to which the bag with an infusible product is attached it is possible to take actions for preparing a beverage from an infusible product in a hygienic way, easily and safely for a user's fingers, which actions include putting the bag with an infusible product into a vessel with hot water, removing the bag with an infusible product from the vessel and squeezing of infusion from the bag into the vessel.

There is also disclosed an analog of the single-use means for preparing a beverage, containing a bendable sheet-like base to which there is attached an open bag that may be filled with a desired infusible product by a user himself (Application RU 2014152918 (the Applicant)).

According to the aforesaid technical solutions, either the sealed bag with infusible product of U.S. Pat. No. 2,728,672 or the open bag to be filled with infusible product of Application RU 2014152918 is attached to a bendable sheet-like base such that the bag can be placed in a suspended state in a vessel with a hot liquid for brewing a product, and the bendable sheet-like base can cover the vessel during the brewing of a product, i.e. it serves as a cap maintaining temperature of a beverage in the vessel. After the brewing of a product the bendable sheet-like base together with the bag containing an infusible product is raised slightly, and infusion from the infusible product in the bag is squeezed by bending the sheet-like base along a straight bend line provided therein and further pressing the product in the bag by areas of the sheet-like base, situated on both sides of the said straight bend line.

Thus, due to the use of the bendable sheet-like base there is provided easy-to-use placement of the bag in the vessel, the vessel with a hot liquid is covered during the brewing to slow the liquid cooling, and the bag may be pressed by fingers in a safe way for flowing out of infusion without any contact between the fingers and the bag.

However, the abovementioned known single-use means for preparing a beverage have a number of shortcomings, namely:

When a user squeezes a bag of the known single-use means, were a throat of the bag with tea is attached to the sheet-like base near and in parallel with a bend line of the sheet-like base (U.S. Pat. No. 2,728,672), inner surfaces of the sheet-like base of the closest analog of invention contact both the front and the back sides of the bag, i.e. provide a large area of contact with the bag, making it more flat when pressed. However, with such a large area of contact it is more difficult to provide complete squeezing of an infusion from an infusible product, since it is necessary to apply more force. Furthermore, part of the infusion squeezed from the bag may be spilled near the vessel, which causes not only loss of part of the infusion, but also dripping of the infusion onto a table or clothing. This is due to the fact that during squeezing of the bag with an infusible product in the known single-use means the squeezed liquid will be directed not only to the lower portion of the bag, but also to lateral edges of the bag, and will flow out divergently, and taking into account that size of the bag bottom may be consistent with diameter of an upper rim of the vessel, e.g. such as a glass, where brewing takes place, there is a very high risk that the infusion drops flowing out when the bag is pressed may fall outside the limits of the rim circumference of the vessel over which the squeezing takes place. Furthermore, with the above mentioned attachment of the bag with respect to the bend line of the sheet-like base the infusion will also flow down the edges of inner surfaces of the bended sheet-like base, and this also may result in spilling part of the infusion near the vessel with a beverage, because width of the sheet-like base usually exceeds diameter of a rim of the vessel where the beverage is prepared.

Furthermore, with the above mentioned location of the line of attachment of the upper portion of the bag, which substantially coincides with the bend line, the sheet-like base must have sufficient length, such that the bag in its initial state and during squeezing could not go beyond edges of the bended sheet-like base. At the same time, the known sheet-like base must be sufficiently wide to cover completely the vessel opening limited by its upper rim, and in any case it must be wider than the bag, otherwise during squeezing the bag will project laterally from under edges of the bended sheet-like base, posing not only the risk of spilling the infusion near the vessel, but also the risk of contact between the hot infusion and fingers, which must be entirely excluded. Therefore, when the upper portion of the bag is attached substantially in parallel with the bend line of the sheet-like base, the sheet-like base will have non-functional lateral area, as shown in FIG. 1 of U.S. Pat. No. 2,728,672, which means unpractical consumption of material for preparing the sheet-like base. The mentioned problem in the said US patent is a little decreased by showing in FIG. 1 a bag which form differs from that of a standard tea bag.

In case of a single-use means with an open bag according to Application RU 2014152918, where an open upper portion of the bag shown in the drawings is attached to the sheet-like base also substantially in parallel with the bend line of the sheet-like base (see FIGS. 3 and 4), the shortcomings are substantially the same as those described in the above mentioned technical solution of U.S. Pat. No. 2,728,672. Furthermore, for opening the upper portion ("throat") of the bag to fill it with a desired infusible product the sheet-like base of the single-use means according to RU 2014152918 must be bent not along the bend line of the base, but with the use of such properties of the sheet-like base material as flexibility and elasticity. This complicates the operation of filling the bag and raises additional requirements to material of the sheet-like base of the known single-use means for preparing a beverage.

SUMMARY OF THE INVENTION

This invention solves the problem of providing a safer and more easy-to-use single-use means for preparing a beverage of the abovementioned type, which may be produced at lower cost, taking into account relaxation in the requirements to material of the sheet-like base.

The said problem may be solved by the proposed single-use means for preparing a beverage from an infusible product, comprising a bendable sheet-like base with a designated bend line extending through the sheet-like base, and a bag for insertion of the said product, made of fluid-permeable material, wherein the bag has an upper portion attached by one side to the sheet-like base, and an unattached lower portion, wherein the sheet-like base and the bag for brewing a product are designed and mutually arranged such that the sheet-like base can cover a vessel containing a liquid in which the bag is immersed during the brewing of a product, and such that the product can be squeezed after the brewing by bending the sheet-like base and pressing the bag from two opposing sides using the bendable sheet-like base, wherein the proposed single-use means for preparing a beverage is characterized in that the region in which the said attached side of the upper portion of the bag is attached to the sheet-like base is situated along a line which intersects the said bend line of the sheet-like base, wherein the line along which the attachment region of the bag is situated substantially coincides with the bend of the bag in its suspended state on the base during use.

Terms

"Bag" means herein a bag of any acceptable form, made of appropriate fluid-permeable material which is sufficiently strong when moistened, but which may be easily crumpled and recycled. Appropriate materials for producing such bags are well known to persons skilled in the art.

"Sheet-like base" means herein a substantially flat piece of material, such as plastic, cardboard or laminated (multi-layer) material, which is usually thin, but sufficiently strong and rigid, such that the sheet-like base could maintain its flatness when being manipulated. Depending on specific materials used for the sheet-like base and the bag, the bag may be attached to the sheet-like base e.g. by means of an adhesive appropriate for food products or by heat sealing. In case of a small volume of output for this purpose it is possible to use also mechanical fixation, e.g. by clamps or broaching. Sizes and form of the sheet-like base should be chosen such that it could cover a vessel containing a liquid in which the bag is immersed. Configuration of the sheet-like base may be different. The most efficient form with respect to material consumption is a rectangular form, however, the sheet-like base may also have rounded corners.

"Attachment region" means a region of one of the bag sides, where there is provided attachment of the bag to the sheet-like base e.g. by an adhesive or known mechanical means. It is clear that it is not necessary for the attachment to be continuous through the whole attachment region. It is quite possible that the attachment takes place e.g. in several points, in the form of a dotted or thin line. In any case, during use, when the bag is suspended under the sheet-like base situated horizontally on a vessel, the bag forms a bend on a line along the attachment region. Such a position of the bag with respect to the base hereinafter referred to as "suspended state of the bag". The attachment region of the bag is situated along a line which intersects the bend line of the sheet-like base, wherein the said intersection line may be situated substantially transversely, angularly or cornerwise with respect to the bend line of the sheet-like base. That is, an angle between the said lines may be either right or acute.

The term "brewing" used herein includes also infusing, when a liquid may have temperature which is significantly lower than that of usual brewing of tea, for example.

The term "liquid" covers water, milk, water and milk mixture and similar liquids having appropriate temperature for brewing or infusing of an infusible product.

The term "vessel" means any vessel that is appropriate for brewing a product, e.g. a cup, a mug, a glass, etc. As an appropriate vessel there may be used also a usual teapot without a lid which was earlier lost or broken by a user.

For the purposes of this invention «upper portion" and "lower portion" of the bag are determined with respect to its suspended state, when the upper portion is attached to the sheet-like base by an adhesive or heat sealing. The bag has such a suspended state also during brewing when the bag is immersed in a liquid and the sheet-like base covering a vessel with the liquid is substantially in a horizontal position. Accordingly, the bag edges between the upper and the lower portions of the bag are "lateral edges of the bag".

Preferable Features of the Invention

In one embodiment of the invention the bag may contain an infusible product, such as e.g. tea, coffee or herb. It is clear that in such an embodiment of the single-use means the bag must be sealed for retention of the product.

In another embodiment of the invention a bag for brewing a product is not sealed in its upper portion attached by one side to the sheet-like base, such that during partial bending of the sheet-like base the upper portion of the bag forms an open throat, which allows to fill the bag with a desired product, for example, selected from tea, coffee or herb.

Usually the bag has a substantially rectangular form, however, there are no obstacles for using bags of other, e.g. pyramidal form. Known configurations of the bags produced on commercially available equipment include bags with edges sealed by means of fin-seal, bags with an expanded bottom ("gusset bags"), etc. The present invention does not impose any special constrains on the type and shape of a used bag. However, as a non-limiting example, hereinafter there is shown the use of the simplest bag having a substantially rectangular form with fin-seal edges.

Preferably, the lower (unattached to the base) portion of the bag has an edge which middle area extends downwards with respect to its corner areas. This imparts a convex form to the lower portion of the bag, which convex form additionally increases convexity of the bag bottom when the bag is squeezed, and restricts a stream of infusion flowing from the bottom.

The sheet-like base preferably is made of cardboard, or laminated material, or plastic.

Preferably, the sheet-like base is provided with an edge projection which may be seized by a user's fingers to manipulate the sheet-like base during the brewing without any contact of the user's fingers with a hot vessel or steam exhaling from the vessel.

Preferably, the sheet-like base is also provided with an edge cutout where a spoon stem may be placed. This provides additional comfort in covering a cup containing a liquid with the sheet-like base, when a spoon is already placed into the cup for stirring a beverage.

The said edge projection and edge cutout may have counter forms located on opposed edges of the sheet-like base. Such an embodiment provides saving of material from which a plurality of sheet-like bases are cut out simultaneously with the use of a pattern, where sheet-like bases are mated with each other according to pattern profile.

Preferably, a designated bend line of the sheet-like base is a scored line, though, except scoring, it is possible to use other known methods of weakening material to form a designated bend line on the material of sheet-like base. The bend line preferably extends continuously and straightforwardly from one edge of the sheet-like base to the other edge thereof. However, it is not necessary for the bend line to be straightforward and/or extend from one edge to the other. For example, the designated bend line may be formed only on some areas of a cardboard sheet-like base (by a dotted line), but in such a case bending of the sheet-like base is not complicated and will take place just in the area of designated bend line. Furthermore, the bend line may be formed double, e.g. in the form of two parallel scored lines made at a small distance from each other. It is clear that such modifications are obvious for a person skilled in the art and will be within the scope of this invention.

Technical Result of the Invention

It has been found by the inventor of the present invention that in case the upper portion of the bag is attached along a line that intersects the said bend line of the sheet-like base there is enhanced carefulness of squeezing an infusion and exactness of the infusion dripping into the vessel with a beverage during squeezing of the bag with a wet product after brewing. This is achieved due to the fact that at the first stage of bending the sheet-like base its parts located on both sides of the bend line, as a result of the users actions, approach each other for squeezing the bag, and at first there is pressed the upper portion of the bag, attached transversely or cornerwise with respect to the bend line, such that the width of upper portion of the bag is decreased, then the said parts of the bendable sheet-like base come in touch with upper areas of lateral edges of the bag, such that the bag with a wet product takes on a form tapering off upwards on either side, and the bottom takes on a convex form. When further pressure load is applied by the user's fingers to the said parts of the bendable sheet-like base, approaching each other, pressing of the bag is diffused downwards on either side of the bag, and the bag bottom becomes even more convex. The above-described process of squeezing, due to movement of the pressure from up to down along the bag edges, allows to get during the squeezing a narrower and, consequently, more careful stream of infusion flowing from the bag bottom, than in case of attachment of the upper portion of the bag in parallel to the bend line of the sheet-like base, as is described below. The said effect may be additionally increased if the lower portion of the bag is made with an edge of such a form where a middle area of that edge extends downwards with respect to corner areas of the said lower portion. This provides the bag bottom which already in the initial state has a convex form contributing to careful squeezing of an infusion from the bag with an infusible product at the very beginning of the squeezing. This embodiment is preferable, but not obligatory, since the features set forth in Claim 1 are sufficient to impart convexity to the bag bottom during squeezing, and it is clear from the foregoing that carefulness of squeezing is provided first of all by diffusion of pressure of the bag along its lateral edges, and convexity of the bottom is secondary or dependent on such pressure.

The above-described technical effect is maximum when the attachment region of the bag is situated substantially transversely to the bend line of the sheet-like base, and it decreases with diversion of the intersection direction from the transverse direction, but nevertheless the said effect will take place until the attachment region is parallel or coinciding with the bend line of the sheet-like base.

When the upper portion of the bag is attached in parallel to the bend line of the sheet-like base (as in the prior art), during pressure of the bag for squeezing a wet infusible product, approaching parts of the bendable sheet-like base come in touch not with the lateral edges, but with a front side and a back side of the bag, which causes flattening of the bag and distribution of the applied pressure load over the entire area of the bag sides, such that the infusion may splash from the lateral edges instead of flowing down from the lower portion of the bag.

Furthermore, the attachment of the upper portion of the bag, made according to this invention, improves stability of flatness of the sheet-like base during manipulations. The sheet-like base intersected by the attachment region of the upper portion of the bag becomes less subject to bending along the bend line, and therefore it better retains its flatness until it is bent for squeezing the bag. It is easily seen that parallel attachment of the bag on or near the bend line does not provide the said stability of flatness of the sheet-like base provided with the bend line.

BRIEF DESCRIPTION OF DRAWINGS

This invention is illustrated by accompanying drawings, where.

LIST OF REFERENCES

Figure 1:
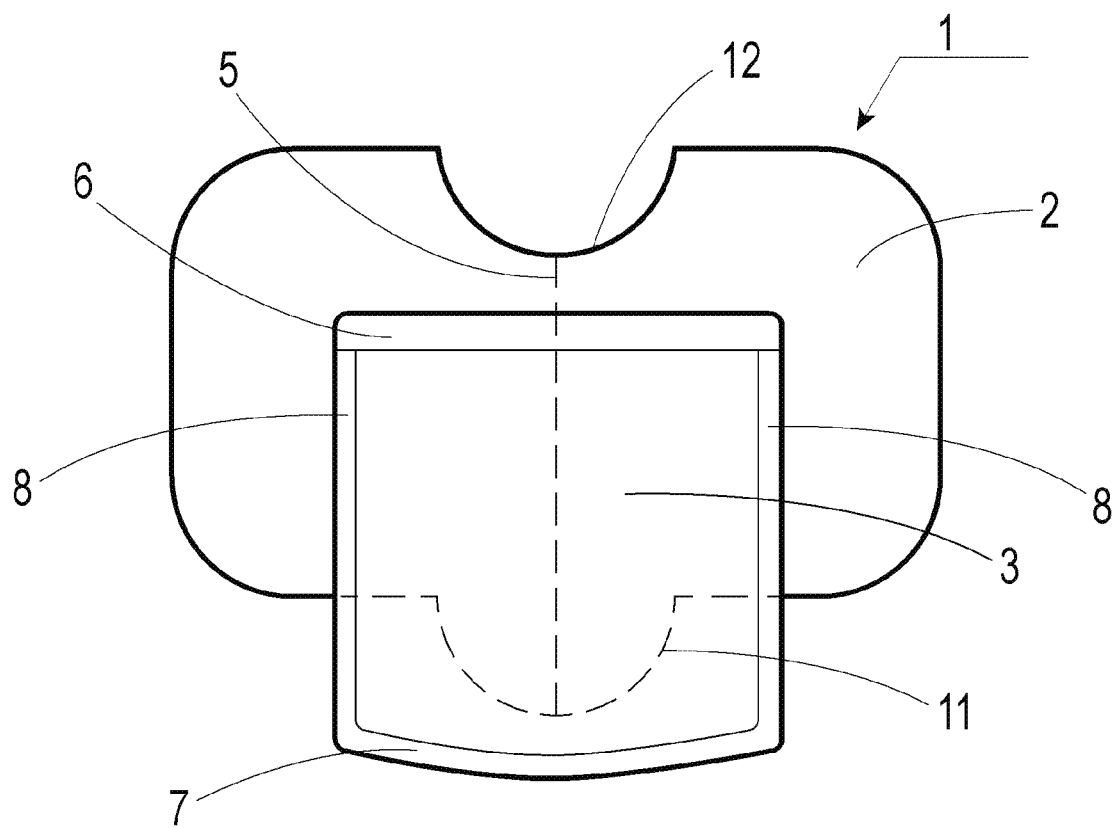
FIG. 1 is a schematic plan view of a single-use means for preparing a beverage according to the invention, where a bag for an infusible product is attached to a sheet-like base substantially transversely to a bend line of the sheet-like base.

1—single-use means for preparing a beverage
2—sheet-like base
3—bag
4—infusible product
5—bend line
6—upper portion of the bag
7—lower portion of the bag
8—lateral edge of the bag
9—non-sealed side of an open upper portion of the bag
10—attachment region where the upper portion of the bag is attached to the base
11—edge projection
12—edge cutout
13—bend of the bag in its suspension state
Embodiments of the Invention Embodiment FIG. 1 shows a schematic view of an embodiment of the proposed single-use means for preparing a beverage, designated in whole by reference 1, which contains a sheet-like base 2 and a bag 3 for insertion of an infusible product 4, attached to the said sheet-like base.

The sealed bag 3 may contain any product suitable for brewing in a liquid for the purpose of preparing a beverage, for example, such as tea, coffee, herb, or other similar product suitable for obtaining an infusion from it.

For brewing a product in the bag 3 a user pours an appropriate liquid, usually hot, for example, such as boiled water, into an appropriate vessel, usually such as a cup or a glass, and covers such a vessel with the sheet-like base 2, such that the bag 3 in its suspended state is immersed in the said liquid.

The sheet-like base 2 is provided with a designated, e.g. scored, bend line 5, extending through the sheet-like base substantially straightforwardly, such that the bend line 5 divides the sheet-like base 2 into two preferably substantially equal parts situated on both sides of the bend line 5. The sheet-like base may be made of material appropriate for food products, such as plastic, cardboard or laminated (multilayer) material, which is sufficiently strong and rigid, such that the sheet-like base could maintain its flatness during manipulations with the singe-use means, without any noticeable deformation. The sheet-like base may have different geometric form, but preferably it is substantially rectangular and may have rounded corners, as shown in FIG. 1. The bag 3 may be sealed and contain a product 4 (shown in FIG. 5) that is subject to brewing in a liquid, or may be non-sealed in its upper portion 6 (see FIG. 3) for filling the bag with a desired infusible product 4, but in any case it has an upper portion 6 attached by one side to the sheet-like base along a line that intersects the bend line 5 designated through the sheet-like base. The bag 3 has also a lower portion 7 that is not attached to the sheet-like base, and lateral edges 8. The unattached lower portion 7 and the lateral edges 8 of the bag are closed or sealed to retain the product in the bag.

The upper portion 6 of the bag preferably is attached to the sheet-like base approximately in its middle, and preferably it has such a size that does not allow the bag edges to go beyond the sheet-like base 2 during use. Though in FIG. 1 the lower portion 7 goes downwards beyond an edge of the sheet-like base, but during the use, i.e. in the suspended state and, in particular, during the squeezing, the lower portion of the bag will not go beyond edges of the sheet-like base. Though in FIG. 1 the upper portion 6 of the bag intersects the bend line 5 of the sheet-like base substantially transversely, the upper portion 6 of the bag may be attached cornerwise, i.e. at an angle to the shown transverse direction (see FIG. 2).

On one of the edges of the sheet-like base, as shown in FIG. 1, there may be provided an edge projection 11 for convenient manipulation with the sheet-like base during brewing, such that a users fingers are always in a safe area without any contact with steam or a hot vessel. In course of efficient edge-to-edge cutting of a plurality of the sheet-like bases with the said edge projection on the other edge of each sheet-like base, which is opposite to the edge with the projection 11, there will be provided an edge cutout 12 of a counter form, which is convenient to use when a spoon is placed into the vessel for stirring, such that the spoon stem could fit in the edge cutout and could not prevent from laying the sheet-like base on the vessel rim when the bag with a product is immersed in a liquid.

Figure 2:
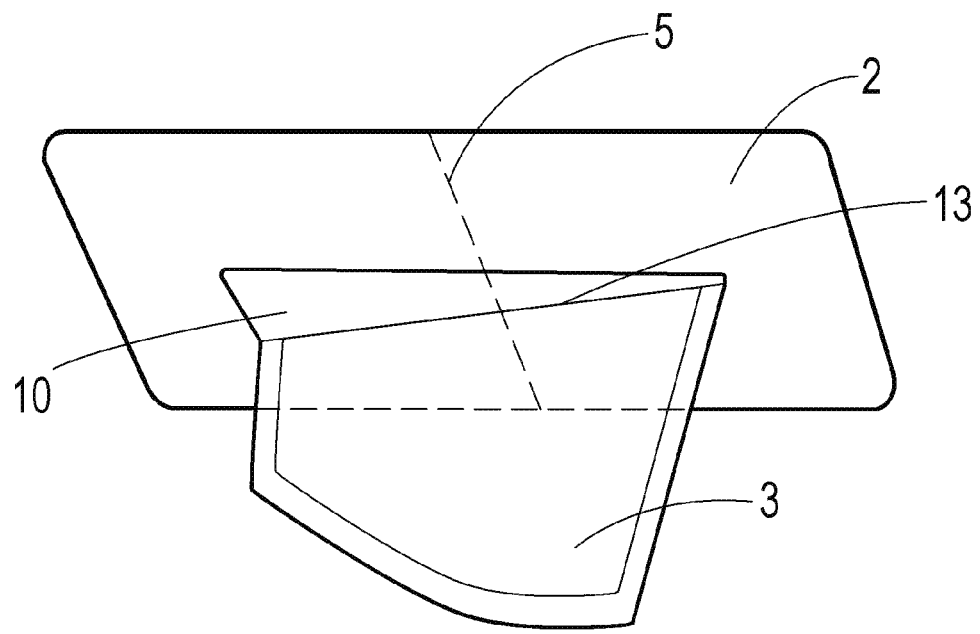
FIG. 2 is a schematic plan view of a single-use means, similar to the view in FIG. 1, where there is shown a bag with an upper portion attached to the sheet-like base along a line directed cornerwise, i.e. at an angle to the direction which is transverse to the bend line.

FIG. 2 schematically shows an example of attachment of the upper portion of the bag cornerwise with respect to the bend line of the sheet-like base. In the shown embodiment the attachment region 10 is situated along a line situated at an acute angle to the bend line 5 and substantially coinciding with the bend 13 of the bag in its suspended state. Though in FIG. 2 there is shown the attachment region 10 of triangular form, it is clear that the attachment region may be in the form of a strip having the same width along the whole length thereof and situated cornerwise with respect to the bend lime 5 of the sheet-like base. FIG. 2 also shows that the lower portion 7 of the bag may have a convex form to increase the effect described above in the section "Technical result".

Figure 3:
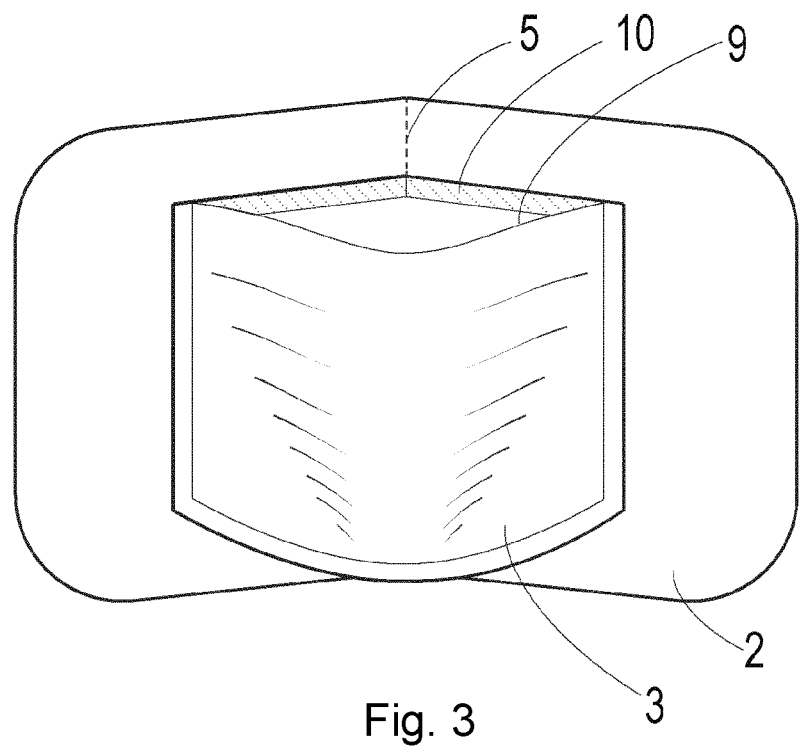
FIG. 3 is a perspective view of a single-use means similar to that shown in FIG. 1, where a bag attached to the sheet-like base has an open (non-sealed) upper portion. The sheet-like base is bent for opening the said upper portion with formation of a throat for filling the bag.

FIG. 3 is a perspective view of the single-use means of FIG. 1, where the bag 3 attached to the sheet-like base 2 has an open upper portion 6 with a non-sealed side 9. The sheet-like base 2 is bent to show opening of the upper portion 6 with formation of a throat by the non-sealed side 9 for filling the bag. The upper portion is attached in the attachment region designated by reference 10.

Figure 4:
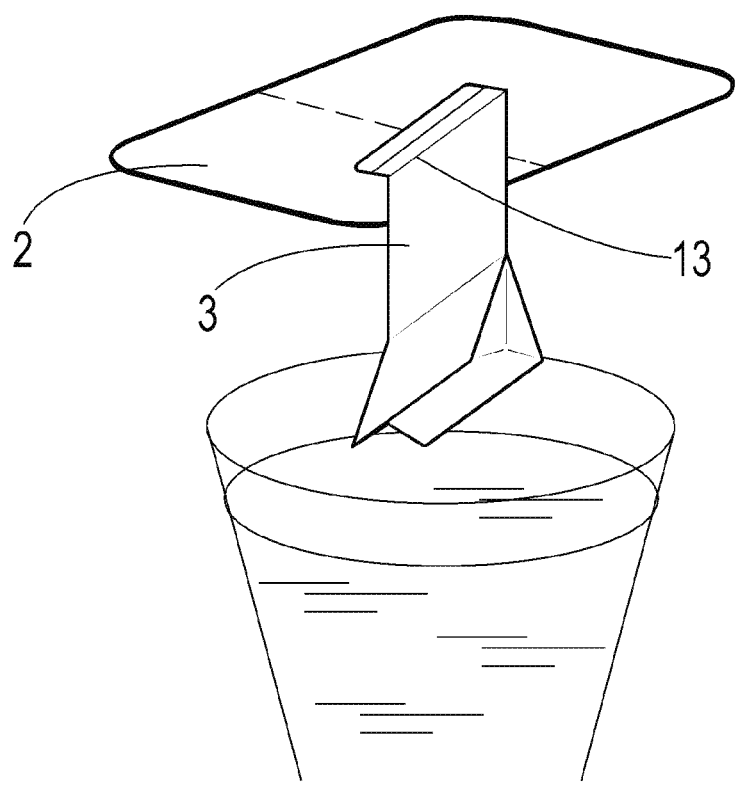
FIG. 4 is a perspective view of a single-use means according to this invention in the process of preparing a beverage in a vessel.

FIG. 4 shows laying of the sheet-like base 2 on a rim of the vessel with a liquid. As a result, when the vessel with a liquid is covered by the sheet-like base 2, the bag 3 with a product is immersed in the liquid in a suspended state. At the same time, since the bag is hanged on the sheet-like base by its upper portion attached by one side to the sheet-like base, during the brewing the attached upper portion is bent substantially at right angle to the rest of the bag 3. The bag bend 13 may be previously designated on the bag material, but this is not obligatory, since the bag is made of deformable material and in its suspended state it easily bends down from the attachment region. Due to this in the embodiment with the open upper portion of the bag, as shown in FIG. 3, the non-sealed side 9 of the open upper portion will tightly adjoin the attachment region 10 from the other side of the bag, attached to the sheet-like base, providing thereby closure of the bag throat during the brewing.

Figure 5A:
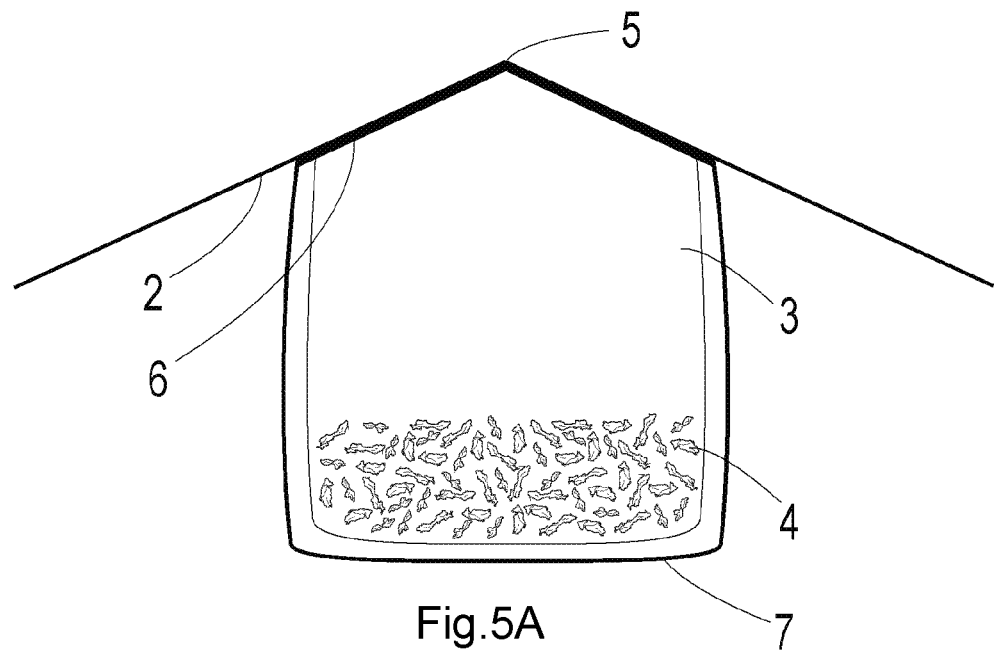
FIG. 5A-B are schematic views illustrating stages of squeezing the bag with the help of the sheet-like base, where on FIG. 5A there is shown beginning of the squeezing, and on FIG. 5B—a middle stage of this process.
Figure 5B:
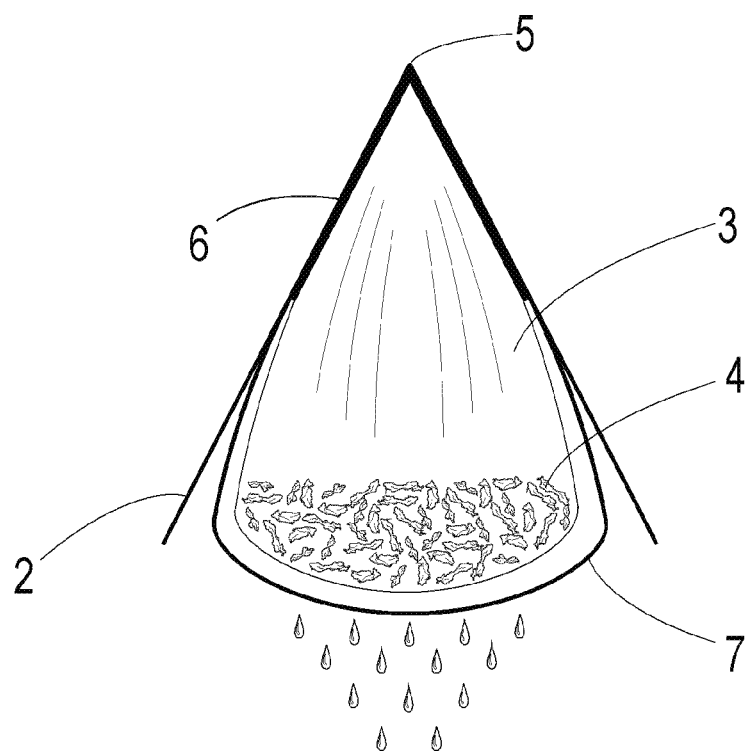

FIGS. 5A and 5B illustrate the process of squeezing of an infusion from the wet product 4 in the bag 3 with the help of the sheet-like base 2. For squeezing the infusion from the wet product in the bag a user raises slightly the sheet-like base and, holding it in such a way that the bag 3 is situated over the vessel, bends the sheet-like base 2 along the bend line 5. Due to the fact that the upper portion 6 of the bag is attached along the line intersecting the bend line 5 designated on the sheet-like base, its parts situated on both sides of the bend line 5 approach each other and first press the attached upper portion of the bag (see FIG. 5A), such that a width of the upper portion of the bag is decreased, and then contact upper areas of the lateral edges of the bag, such that the bag with the wet infusible product takes on a form tapering off upwards on either side, and the lower portion 7 (a bottom of the bag) takes on a convex form (see FIG. 5B), even if in the initial state of the bag its lower portion 7 does not have a convex form which is initially provided in the embodiment of the single-use means according to the invention with a bag having its lower portion 7 with a middle area extending downwards with respect to corner areas of the said lower portion.

Thus, the operation of pressing the bag with a wet product in the single-use means for preparing a beverage according to this invention allows a user to obtain a narrower and more careful stream of infusion flowing from the bag bottom during the squeezing, than that in case the attachment region of the upper portion of the bag is situated in parallel or coincides with the bend line of the sheet-like base, as explained in the section "Technical result".

The invention claimed is:

1. A single-use infusion package for preparing a beverage from an infusible product, the single-use infusion package comprising:
   a bendable flat base which has only one designated bend line, wherein the designated bend line extends through the bendable flat base and divides the bendable flat base into two substantially equal parts situated on both sides of the designated bend line, and
   a bag for insertion of the infusible product, made of fluid-permeable material, wherein the bag has an unattached lower portion and an upper portion attached by one side to an underside of the bendable flat base along an attachment line that once intersects the designated bend line, the upper portion is open for filling the bag with the infusible product, and the attached one side of the upper portion of the bag is capable of forming a bend that coincides with the attachment line upon suspension of the bag during use; and
   wherein the bendable flat base does not have an opening, and is capable of bending along the designated bend line for covering lateral edges of the bag and pressing the bag by two opposing sides of the bendable flat base to squeeze liquid from the bag after brewing.

2. The single-use infusion package of claim 1, wherein the bag contains the infusible product and is sealed for retention of the infusible product.

3. The single-use infusion package of claim 1, wherein the bag has substantially a rectangular form.

4. The single-use infusion package of claim 3, wherein the unattached lower portion of the bag has an edge with a middle area extending downwards with respect to corner areas of the unattached lower portion.

5. The single-use infusion package of claim 1, wherein the bendable flat base is made of cardboard or laminated material or plastic.

6. The single-use infusion package of claim 1, wherein the attachment line intersects the designated bend line substantially transversely.

7. The single-use infusion package of claim 1, wherein the attachment line intersects the designated bend line slantwise.

8. The single-use infusion package of claim 1, wherein the bendable flat base is provided with an edge projection for manipulations with the bendable flat base during the brewing.

9. The single-use infusion package of claim 8, wherein the bendable flat base is provided with a cutout for a spoon during the brewing.

10. The single-use infusion package of claim 9, wherein the edge projection and the cutout are situated on the opposing edges of the bendable flat base, and the shape of the cutout is identical to the shape of the edge projection.

11. The single-use infusion package of claim 1, wherein the designated bend line of the bendable flat base is a scored line.

* * * * *